United States Patent
Kume

(10) Patent No.: US 7,990,439 B2
(45) Date of Patent: Aug. 2, 2011

(54) SOLID-STATE IMAGING APPARATUS HAVING PHOTOELECTRIC CONVERSION DEVICE

(75) Inventor: Atsuko Kume, Sagamihara (JP)

(73) Assignee: Olympus Corporation, Tokyo (JP)

( * ) Notice: Subject to any disclaimer, the term of this patent is extended or adjusted under 35 U.S.C. 154(b) by 480 days.

(21) Appl. No.: 12/173,428

(22) Filed: Jul. 15, 2008

(65) Prior Publication Data

US 2009/0021622 A1 Jan. 22, 2009

(30) Foreign Application Priority Data

Jul. 17, 2007 (JP) ................................ 2007-185500

(51) Int. Cl.
*H04N 5/217* (2011.01)
*H04N 9/64* (2006.01)
(52) U.S. Cl. .................... 348/241; 348/245; 348/308
(58) Field of Classification Search .................. 348/241, 348/243, 245, 248, 251, 308
See application file for complete search history.

(56) References Cited

U.S. PATENT DOCUMENTS

| | | | | |
|---|---|---|---|---|
| 6,618,090 B1 * | 9/2003 | Kidono et al. | ................ | 348/362 |
| 6,798,450 B2 * | 9/2004 | Baer | ............................ | 348/248 |
| 6,950,131 B1 * | 9/2005 | Kleinhans et al. | ............ | 348/241 |
| 7,167,204 B2 * | 1/2007 | Kidono et al. | ................ | 348/364 |
| 7,289,155 B2 * | 10/2007 | Kidono et al. | ................ | 348/364 |
| 7,479,995 B2 * | 1/2009 | Dosluoglu | .................... | 348/241 |

FOREIGN PATENT DOCUMENTS

JP 2006108889 A 4/2006

OTHER PUBLICATIONS

Translation of JP 2006-108889 A.*

* cited by examiner

*Primary Examiner* — John M Villecco
(74) *Attorney, Agent, or Firm* — Westerman, Hattori, Daniels & Adrian, LLP

(57) ABSTRACT

A solid-state imaging apparatus including, among other things, a control section that, after simultaneous and concurrent reset of all first and second input sections, effects control so as to cause all the first input sections to concurrently and simultaneously accumulate the signal associated with the object image having the same exposure start timing; a correction data retaining section that retains correction data to correct a characteristic variance between the first input section and the second input section where the correction data is generated by taking a difference between a noise signal of the first input section and a noise signal of the second input section containing the characteristic variance; and a variance correction section that generates a third pixel signal corresponding to a difference between the first pixel signal and the second pixel signal where the characteristic variance is corrected by subtracting the correction data from the third pixel signal.

7 Claims, 15 Drawing Sheets

SOLID-STATE IMAGING APPARATUS HAVING PHOTOELECTRIC CONVERSION DEVICE

This application claims benefit of Japanese Patent Application No. 2007-185500 filed in Japan on Jul. 17, 2007, the contents of which are incorporated by this reference.

BACKGROUND OF THE INVENTION

The present invention relates to solid-state imaging apparatus having photoelectric conversion device, and more particularly relates to the solid state imaging apparatus where all pixel signals are read out at high rate with setting a certain exposure time so that image having high S/N can be acquired.

It is known to construct solid-state imaging apparatus such that photoelectric conversion sections of all pixels are concurrently reset to start accumulation of signal, and after concurrently transferring signals of the photoelectric conversion sections of all pixels to memory after a predetermined time, the signals are sequentially read out. In such a solid-state imaging apparatus, retaining time of signal at memory is different from one pixel row to another. For this reason, leak current occurring at memory and electric charge occurring due to leakage of light shed on memory are different between each pixel row depending on such retaining period, and thus become cause of shading.

To mitigate this, Japanese Patent Application Laid-Open Publication 2006-10889 for example has proposed a solid-state imaging apparatus where elimination of shading is made possible by subtraction between the pixel signals of a first row or column and the pixel signals of a second row or column. FIG. 1 is a diagram showing construction of the solid-state imaging apparatus disclosed in the publication, and FIG. 2 is a timing chart for explaining its operation. The construction of the solid-state imaging apparatus disclosed in the above publication will now be described by way of FIG. 1.

Provided at the inside of pixel PIX11 are: a photoelectric conversion section PD11; a memory C11 (hereinafter referred simply to as FD) for accumulating signal generated at the photoelectric conversion section PD11; a transfer switch MT11 for controlling transfer from the photoelectric conversion section PD11 to FD; a reset switch MR11 for resetting FD; an amplification section MA11 for amplifying signal of FD; and a select switch MS11 for selecting the pixel. These are connected as shown in FIG. 1 to form a pixel. A plurality of pixels having such construction are two-dimensionally arranged (2 rows by 2 columns in the illustrated example) to form a pixel section. It should be noted that the constituent components of the other pixels PIX12, PIX21, PIX22 of the pixel section are denoted by those numerals that correspond to row and column of each pixel.

The transfer switches MT11, MT12 of pixels PIX11, PIX12 of the first row are controlled by transfer control signal φTX1 outputted from a vertical scanning circuit 101, and transfer switches MT21, MT22 of pixels PIX21, PIX22 of the second row are controlled by transfer control signal φTX2. The select switches MS11, MS12 of pixels PIX11, PIX12 of the first row are controlled by select control signal φSEL1, and the select switches MS21, MS22 of pixels PIX21, PIX22 of the second row are controlled by select control signal q SEL2. The pixel output signals of selected row are written to a line memory 102 through a vertical signal line 105. Subsequently, the output signals stored at the line memory 102 are read out by a horizontal scanning circuit 103. It should be noted that numeral 104 in FIG. 1 denotes a control section for controlling operation of the vertical scanning circuit 101 and line memory 102.

The operation of the solid-state imaging apparatus having such construction will now be described by way of a timing chart shown in FIG. 2. At first, transfer control signals φTX1, φTX2, and reset control signals φRST1, φRST2 are driven to high level to start concurrent reset of photoelectric conversion section PD and FD of all pixels. Next, transfer control signals φTX1, φTX2 are brought to low level to end reset period of the photoelectric conversion section PD so that accumulation of light signal is started. Next, reset control signals φRST1, φRST2 are brought to low level to end reset of FD. Subsequently, transfer control signal φTX1 to the pixels of the first row is driven to high level to end an accumulation period and effect transfer to FD of the accumulated electric charge of photoelectric conversion section PD of the pixels of the first row. The transfer control signal φTX2 to the pixels of the second row on the other hand maintains low level so as not to effect transfer to FD of the accumulated electric charge of photoelectric conversion section PD of the pixels of the second row. Next, pixel rows selected by select control signal in the manner of time series are sequentially read out. In particular at first, the select control signal φSEL1 is driven to high level to output pixel signals of the pixel (main pixel) row of the first row to the line memory 102 through the vertical signal line 105, and the select control signal φSEL1 is brought to low level to end the outputting. Next, select control signal φSEL2 is driven to high level to output pixel signals of the pixel (sub pixel) row of the second row to the line memory 102. These operations are sequentially continued.

The output signal of such main pixel row (first pixel row) becomes a signal where FD leak signal (referred to as Vsf in this description) and signal due to leakage light (referred to as Vse in this description), i.e. noise signals are added to light signal (referred to as Vp in this description) accumulated at the photoelectric conversion section. The output signal of the main pixel row supposed as Vs1 is represented in symbols as in the following equation (1).

$$Vs1 = Vp + Vsf + Vse \tag{1}$$

Further, the output signal of sub pixel row (second pixel row) becomes a signal where FD leak signal Vnf and signal by leakage light Vne, i.e. noise signals are added up so that the output signal of the sub pixel row supposed as Vn1 is represented in symbols as in the following equation (2).

$$Vn1 = Vnf + Vne \tag{2}$$

In this case, since the main pixel and the sub pixel are read out at substantially the same point in time, FD leak signal and signal due to leakage light are respectively of substantially the same value, and are represented in symbols as:

$$Vsf = Vnf, Vse = Vne.$$

Accordingly, difference between the main pixel signal and the sub pixel signal is obtained as:

$$Vs1 - Vn1 = Vp$$

Further, the disposition of main pixel 1 and sub pixel 2 in the pixel section may be as shown in FIG. 3 so that the main pixel 1 and sub pixel 2 are disposed at every other row.

SUMMARY OF THE INVENTION

In a first aspect of the invention, there is provided a solid-state imaging apparatus including: a pixel section with a plurality of pixels that are two-dimensionally arranged, the pixels including a first pixel having a first input section for accumulating a signal associated with object image, a first amplification section for amplifying signals accumulated at the first input section so as to generate a first pixel signal, a first reset section for resetting the first input section, and a first select section for selecting the first amplification section to cause the first pixel signal to be outputted onto a signal output line, and a second pixel having a second input section for accumulating a signal corresponding to a noise generated at the first input section, a second amplification section for amplifying signals accumulated at the second input section so as to generate a second pixel signal, a second reset section for resetting the second input section, and a second select section for selecting the second amplification section to cause the second pixel signal to be outputted onto the signal output line; a control section for, after simultaneously and concurrently resetting all the first and second input sections, effecting control so as to cause all the first input sections to concurrently and simultaneously accumulate the signal associated with the object image having the same exposure start timing; a correction data retaining section for retaining correction data to correct a characteristic variance between the first input section and the second input section; and a variance correction section for generating a third pixel signal corresponding to a difference between the first pixel signal and the second pixel signal where the characteristic variance is corrected based on the correction data.

In a second aspect of the invention, the first pixel in the solid-state imaging apparatus according to the first aspect further includes a first photoelectric conversion section and a first transfer section for transferring a signal generated at the first photoelectric conversion section to the first input section, and the second pixel further includes a second photoelectric conversion section and a second transfer section for transferring a signal generated at the second photoelectric conversion section to the second input section, the control section effecting control so as to start an accumulation of the signal at the first and second photoelectric conversion sections with simultaneously and concurrently resetting all the first and second photoelectric conversion sections, and after a predetermined time so as to simultaneously and concurrently effect a transfer of the signal from the first photoelectric conversion section to the first input section for the first pixels while on the other hand so as not to effect a transfer from the second photoelectric conversion section to the second input section for the second pixels.

In a third aspect of the invention, the first pixel in the solid-state imaging apparatus according to the first aspect further includes a photoelectric conversion section and a first transfer section for transferring a signal generated at the photoelectric conversion section to the first input section, and the second pixel further includes a connecting section for connecting between a constant potential supply and the second input section, the control section effecting control so as to start an accumulation of the signal at the photoelectric conversion section with simultaneously and concurrently resetting the photoelectric conversion section of all the first pixels, and after a predetermined time so as to simultaneously and concurrently effect a transfer of the signal from the photoelectric conversion section to the first input section for the first pixels while on the other hand so as not to effect a function of the connecting section for the second pixels.

In a fourth aspect of the invention, the second pixel in the solid-state imaging apparatus according to the first aspect is disposed for every predetermined ones of the first pixels.

In a fifth aspect of the invention, the variance correction section in the solid-state imaging apparatus according to the first aspect corrects the correction data in accordance with an exposure time.

In a sixth aspect of the invention, the correction data retaining section in the solid-state imaging apparatus according to the first aspect, after simultaneously resetting the first and second input sections, generates the correction data based on an output signal from the first pixel obtained with accumulating at the first input section the signal associated with the object image having the same exposure start timing and substantially zero exposure time and an output signal from the second pixel.

In a seventh aspect of the invention, the correction data retaining section in the solid-state imaging apparatus according to the first aspect, after simultaneously resetting the first and second input sections, generates the correction data based on an output signal from the first pixel obtained without accumulation of the signal associated with the object image at the first input section and an output signal from the second pixel.

DESCRIPTION OF THE PREFERRED EMBODIMENTS

Some embodiments of the solid-state imaging apparatus according to the invention will be described below with reference to the drawings.

Embodiment 1

Figure 1:
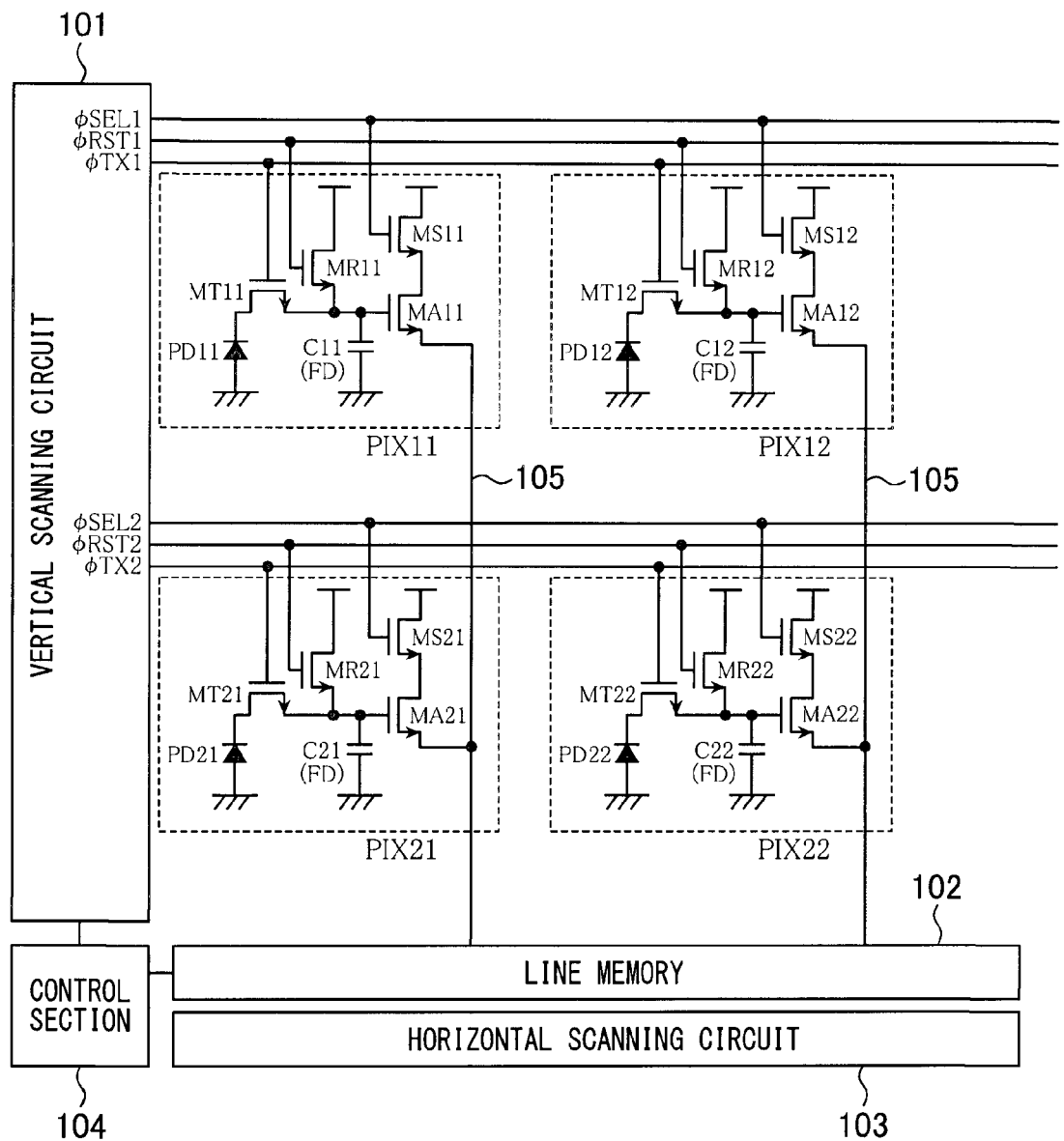
FIG. 1 is a circuit diagram partially in blocks showing an example of construction of prior-art solid-state imaging apparatus.
Figure 4A:
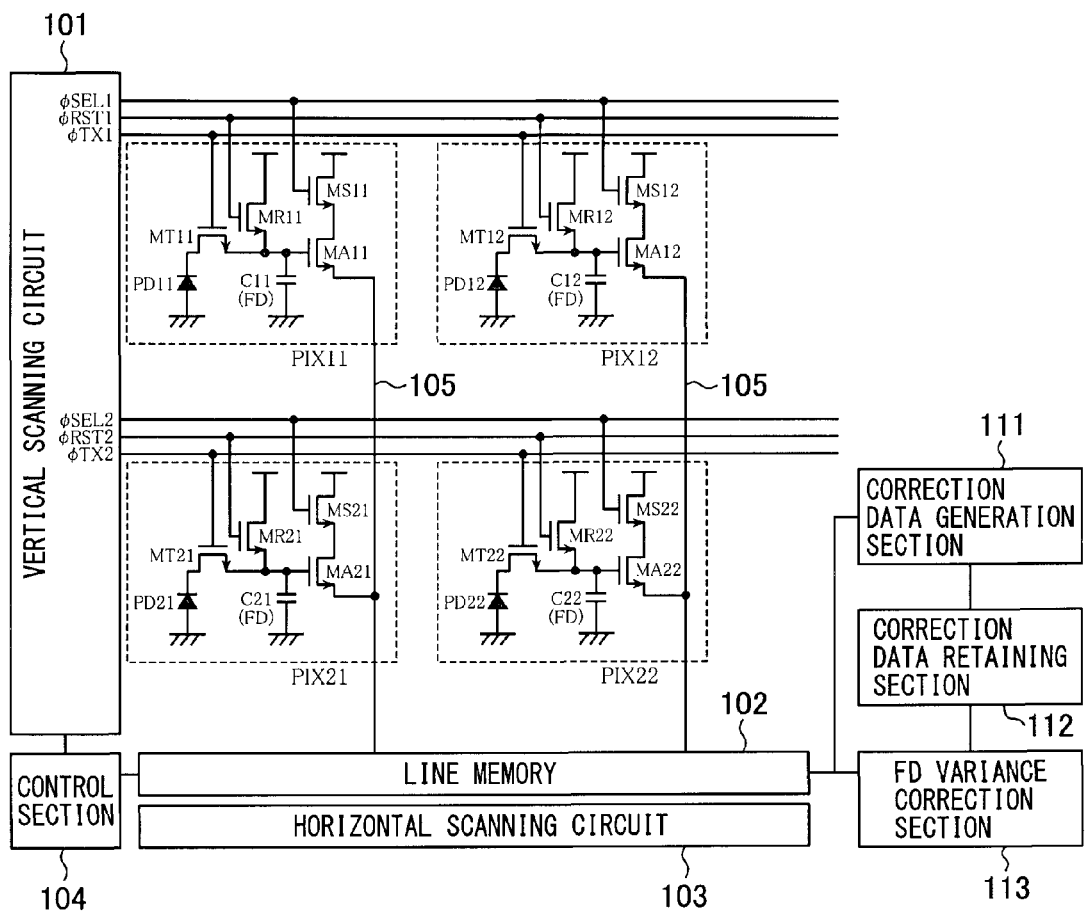
FIGS. 4A and 4B are to show construction of an embodiment of the solid-state imaging apparatus according to the invention, and to explain computing operation of image data thereof.
Figure 4B:
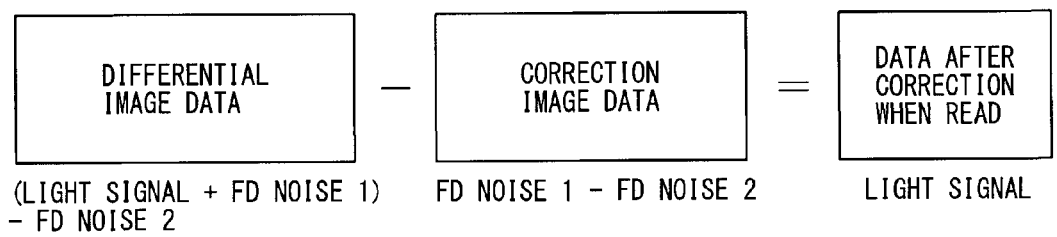

A first embodiment will now be described. FIG. 4A shows construction of the solid-state imaging apparatus according to the first embodiment. A correction data generation section 111, correction data retaining section 112, and FD variance correction section 113 are added in as compared to the prior-art example shown in FIG. 1. The construction other than these added components is the same as the prior-art example shown in FIG. 1 and will not be described. Further FIG. 4B schematically explains an image data computing method.

An outline of the computing method of image data will now be described by way of FIG. 4B. At first similarly to the prior-art example, output signal of sub pixel consisting of FD noise signal containing variance is differentiated from output signal of main pixel containing light signal and FD noise signal to acquire a differential image data. Next at the correction data generation section 111, a difference between FD noise signal of the main pixel and FD noise signal of the sub pixel containing variance is taken to obtain a correction image data, which is retained at the correction data retaining section 112. Next an image having excellent S/N can be obtained such that the correction image data is subtracted from the differential image data at the FD variance correction section 113 to compute final image data.

Figure 2:
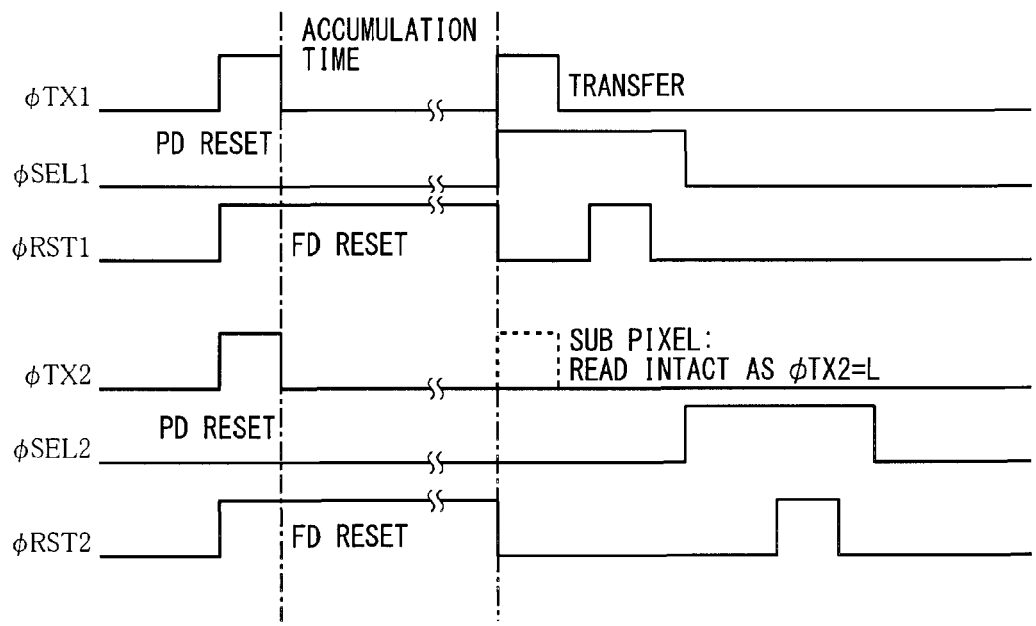
FIG. 2 is a timing chart for explaining operation of the solid-state imaging apparatus according to the prior-art example shown in FIG. 1.
Figure 3:
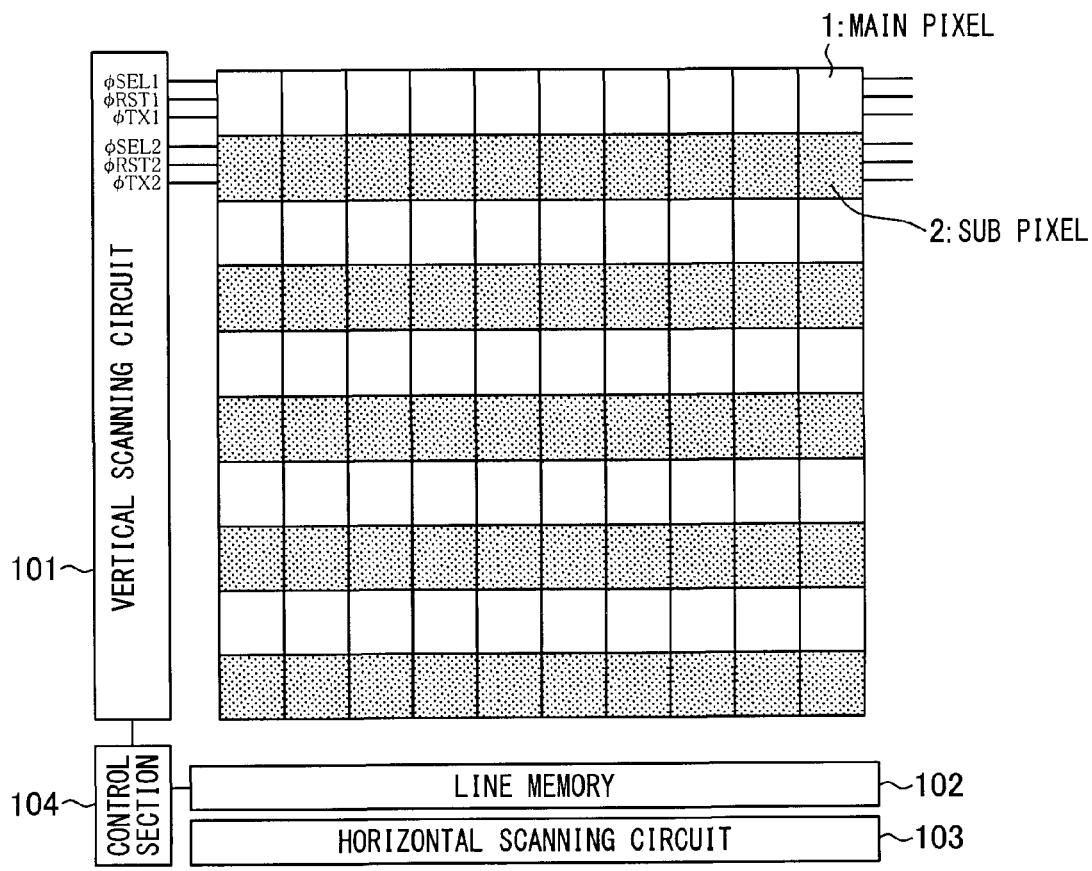
FIG. 3 shows an example of disposition of main pixels and sub pixels in a pixel section in the solid-state imaging apparatus according to the prior-art example shown in FIG. 1.
Figure 5:
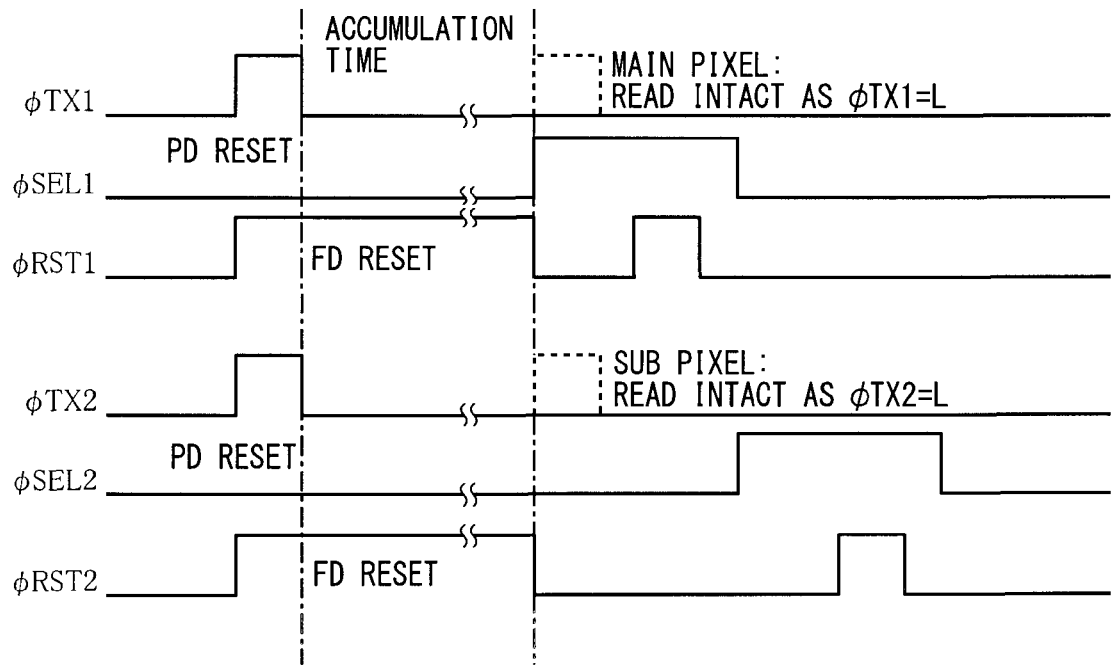
FIG. 5 is a timing chart for explaining drive operation at the time of acquiring correction image data in the first embodiment shown in FIG. 4A.

The disposition of main pixels and sub pixels in the pixel section is similar to the prior-art example shown in FIG. 3 and will not be described. Further the operation for acquiring the differential image data is the same as the operation for acquiring a differential image data in the prior-art solid-state imaging apparatus shown in the timing chart of FIG. 2, and will not be described. The drive method at the time of acquiring correction image data will now be described by way of a timing chart of FIG. 5. At first, transfer control signals φTX1, φTX2, and reset control signals φRST1, φRST2 are driven to high level to start concurrent reset of the photoelectric conversion section PD and FD (memory) of all pixels. Next, the transfer control signals φTX1, φTX2 are brought to low level to end a reset period of the photoelectric conversion section PD, and an accumulation of light signal is started.

Next, the reset control signals φRST1, RST2 are brought to low level to end the reset of FD, and to start accumulation of signal due to leak at FD and a leakage light. After effecting the accumulation at FD for the same time duration as the acquiring of differential image data, rows selected by select control signal in a manner of time series are sequentially read out while the transfer control signals φTX1, φTX2 are kept to low level. In particular at first, select control signal φSEL1 is driven to high level to output pixel signals of the pixel (main pixel) row of the first row to the line memory 102 through the vertical signal line 105, and the select control signal φSEL1 is then brought to low level to end the outputting of pixel signals of the first row. Subsequently, select control signal φSEL2 is driven to high level to output pixel signals of the pixel (sub pixel) row of the second row to the line memory 102 through the vertical signal line 105, and the select control signal φSEL2 is then brought to low level to end the outputting of pixel signals of the second row.

In such drive operation, output signal of the main pixel (pixels of the first row) is a signal where FD leak signal (referred to as Vsf in this description) and signal due to leakage light (referred to as Vse in this description), i.e. noise signals are added up. Supposing the output signal of the main pixel as Vs3, it is represented in symbols as in the following equation (3).

$$Vs3 = Vsf + Vse \quad (3)$$

Further, output signal of the sub pixel (pixels of the second row) is a signal where FD variance signal Vnb is added to FD leak signal Vnf and leakage light signal Vne, i.e. noise signals so that the output signal of the sub pixel supposed as Vn3 is represented in symbols as in the following equation (4).

$$Vn3 = Vnf + Vne + Vnb \quad (4)$$

In this case, the point in time at which the output signals of the main pixel and the sub pixel are read out is substantially the same, and accumulation period of FD is substantially equal so that the FD leak signals and the leakage light signals are respectively of substantially the same value and are represented by equation of symbols as:

Vsf=Vnf, Vse=Vne.

Accordingly, a correction image data Vr obtained by difference between the output signals of the main pixel and the sub pixel at the correction data generation section 111 is represented in symbols as in the following equation (5).

$$Vr = Vs3 - Vn3 = Vnb \quad (5)$$

Here, since the differential image data is (Vp−Vnb), it is possible to acquire the light signal Vp alone and obtain image having excellent S/N by taking difference between the differential image data and the correction image data at the FD variance correction section 113.

Embodiment 2

Figure 6:
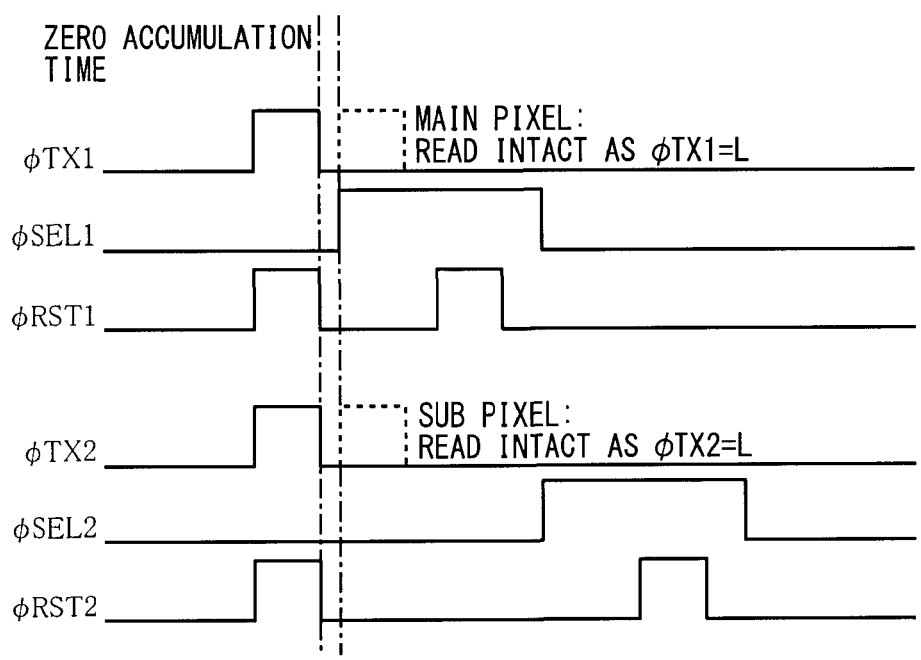
FIG. 6 is a timing chart for explaining drive operation at the time of acquiring correction image data in the solid-state imaging apparatus according to a second embodiment of the invention.

A second embodiment will now be described. The construction itself of the solid-state imaging apparatus according to the second embodiment is the same as the construction of the solid-state imaging apparatus according to the first embodiment shown in FIG. 4A, and its description by way of drawing will be omitted. The second embodiment is different from the first embodiment in the method of acquiring correction image data. FIG. 6 is a timing chart for explaining drive operation at the time of acquiring correction image data in the solid-state imaging apparatus according to the second embodiment. It is different in accumulation time from the timing chart of the first embodiment shown in FIG. 5. In particular at first, transfer control signals φTX1, φTX2, and reset control signals φRST1, φRST2 are driven to high level to start concurrent reset of the photoelectric conversion section PD and FD of all pixels. Subsequently, the transfer control signals φTX1, φTX2 are brought to low level to end the reset period of the photoelectric conversion section PD, and at the same time the reset control signals φRST1, φRST2 are brought to low level to end the reset of FD.

Subsequently in the condition of zero accumulation time of the photoelectric conversion section PD and FD, rows selected by select control signal in a manner of time series are sequentially read out while the transfer control signals φTX1, φTX2 are kept to low level. In particular immediately after bringing the transfer control signals φTX1, φTX2, and reset control signals φRST1, φRST2 to low level, select control signal φSEL1 at first is driven to high level to output the output signal of the pixel (main pixel) row of the first row to the line memory 102, and the select control signal φSEL1 is then brought to low level to end the outputting of pixel signals of the first row. Next, select control signal φSEL2 is driven to high level to output the output signal of the pixel (sub pixel) row of the second row to the line memory 102, and the select control signal φSEL2 is then brought to low level to end the outputting of pixel signals of the second row.

In such drive operation, output signal of the main pixel (pixels of the first row) is the signal where FD leak signal (referred to as Vsf in this description) and signal due to leakage light (referred to as Vse in this description), i.e. noise signals are added up. Supposing the output signal of the main pixel as Vs4, it is represented in symbols as in the following equation (6).

$$Vs4 = Vsf + Vse \quad (6)$$

Further, output signal of the sub pixel is the signal where FD variance signal Vnb is added to FD leak signal Vnf and leakage light signal Vne, i.e. noise signals so that the output signal of the sub pixel supposed as Vn4 is represented in symbols as in the following equation (7).

$$Vn4 = Vnf + Vne + Vnb \quad (7)$$

In this case, since the point in time at which the output signals of the main pixel and the sub pixel are read out is substantially the same, the FD leak signals and the leakage light signals are respectively of substantially the same value and are represented by equation of symbols as:

$$Vsf = Vnf, Vse = Vne.$$

Accordingly, correction image data Vr obtained by difference between the output signals of the main pixel and the sub pixel is represented in symbols as in the following equation (8).

$$Vr = Vs4 - Vn4 = Vnb \quad (8)$$

Figure 7:
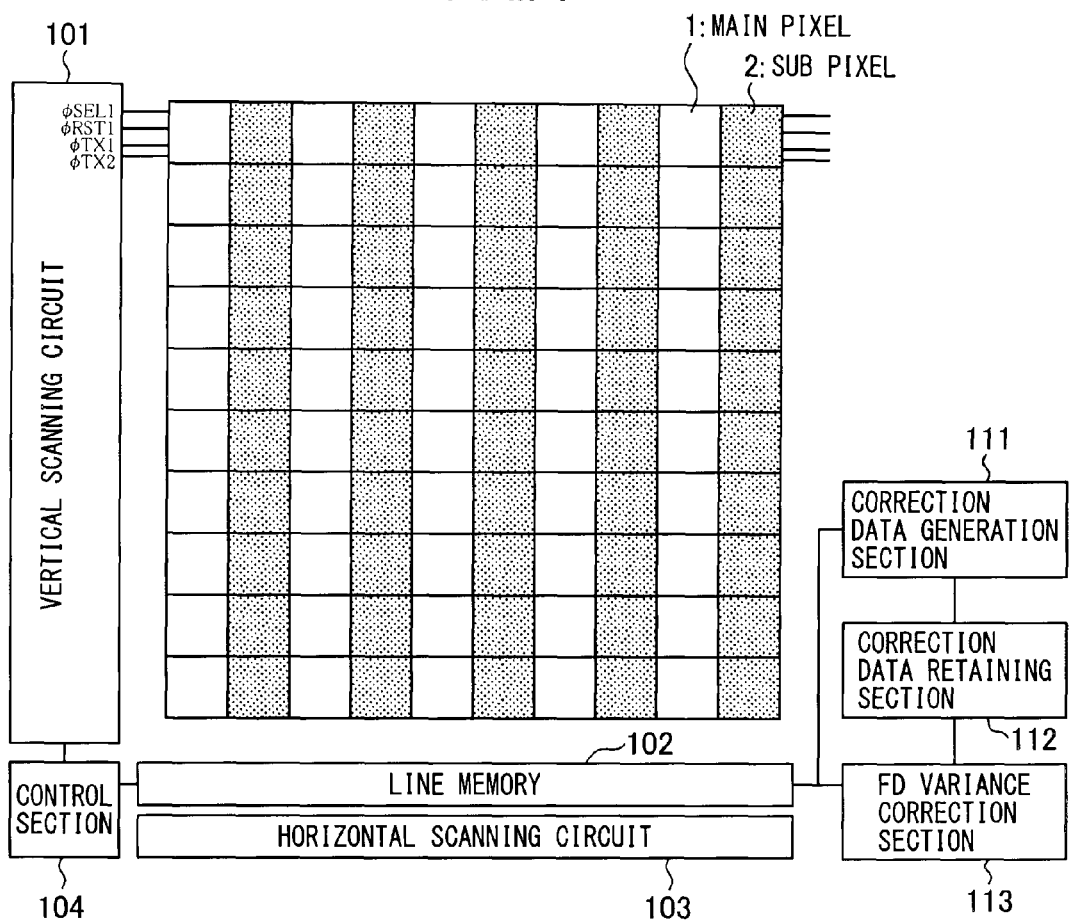
FIG. 7 shows construction of a modification of the solid-state imaging apparatus according to the second embodiment.

Here, since the differential image data is (Vp−Vnb), it is possible to acquire the light signal Vp alone and obtain image having excellent S/N by taking difference between the differential image data and the correction image data Vr. Further, by setting zero the accumulation time of the photoelectric conversion section PD and FD, the time for acquiring correction image data can be shortened. The data computing method after correction is the same as in the first embodiment and will not be described. Further, it is also possible to dispose the main pixel and sub pixel alternately on every other column as shown in FIG. 7.

Embodiment 3

Figure 8:
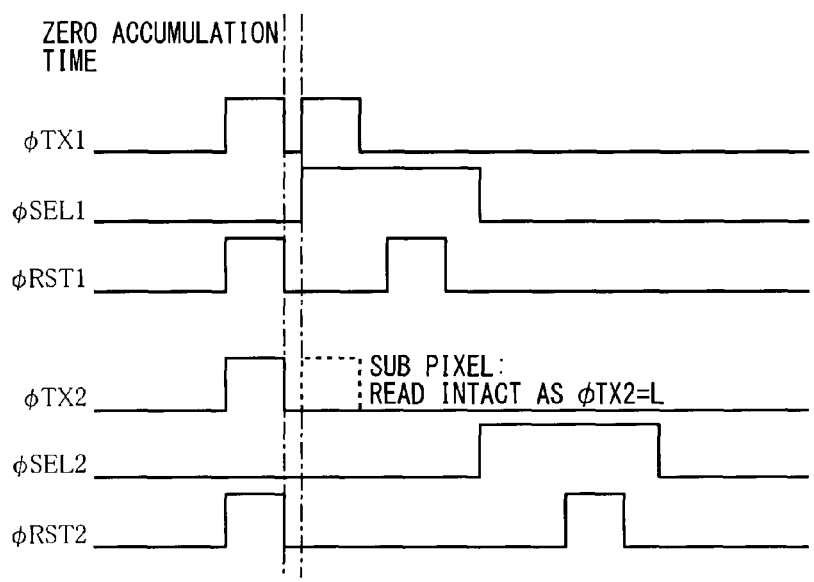
FIG. 8 is a timing chart for explaining drive operation at the time of acquiring correction image data in the solid-state imaging apparatus according to a third embodiment of the invention.

A third embodiment will now be described. The construction itself of the solid-state imaging apparatus according to the third embodiment is the same as the construction of the solid-state imaging apparatus according to the first embodiment shown in FIG. 4A, and its description by way of drawing will be omitted. The third embodiment is different from the first embodiment in the method of acquiring correction image data. FIG. 8 is a timing chart for explaining drive operation at the time of acquiring correction image data in the solid-state imaging apparatus according to the fourth embodiment. While in the timing chart of the second embodiment shown in FIG. 6, the read is effected with keeping the transfer control signal φTX1 of the main pixel to low level when pixel signals are read out of the first row by driving select control signal φSEL1 to high level, the third embodiment is different from the second embodiment in that the transfer control signal φTX1 of the main pixel is driven to high level. In particular at first, transfer control signals φTX1, φTX2, and reset control signals φRST1, φRST2 are driven to high level to start concurrent reset of the photoelectric conversion section PD and FD of all pixels. The transfer control signals φTX1, φTX2 are then brought to low level to end the reset period of the photoelectric conversion section PD. Further at the same time, the reset control signals φRST1, φRST2 are brought to low level to end the reset of FD. Immediately after that, the transfer control signal φTX1 of the main pixel row is driven to high level to effect transfer to FD of signal of the photoelectric conversion section PD. Next, rows selected by select control signal in a manner of time series are sequentially read out. In particular at first, select control signal φSEL1 is driven to high level to output the light signal of the pixel (main pixel) row of the first row to the line memory 102, and the select control signal φSEL1 is then brought to low level to end the outputting of pixel signals of the first row. Next, select control signal φSEL2 is driven to high level with keeping to low level the transfer control signal φTX2 to the second pixel row to output the output signal of the pixel (sub pixel) row of the second row to the line memory 102, and the select control signal φSEL2 is then brought to low level to end the outputting of pixel signals of the second row.

In such drive operation, output signal of the main pixel (pixels of the first row) is the signal where FD leak signal (referred to as Vsf in this description) and signal due to leakage light (referred to as Vse in this description), i.e. noise signals are added to light signal Vpd' accumulated at the photoelectric conversion section PD.

Supposing the signal of the main pixel as Vs5, it is represented in symbols as in the following equation (9).

$$Vs5 = Vpd' + Vsf + Vse \quad (9)$$

Further, output signal of the sub pixel (pixels of the second row) is the signal where FD variance signal Vnb is added to FD leak signal Vnf and leakage light signal Vn1, i.e. noise signals so that the output signal of the sub pixel supposed as Vn5 is represented in symbols as in the following equation (10).

$$Vn5 = Vnf + Vne + Vnb \quad (10)$$

In this case, since the time and period of reading output signals of the main pixel and the sub pixel are substantially the same, the FD leak signals and the leakage light signals are respectively of substantially the same value and are represented by equation of symbols as:

$$Vsf = Vnf, Vse = Vne.$$

At the same time, since light signal is not accumulated when transfer control signal φTX1 is driven to high level immediately after reset of the photoelectric conversion section PD to make very short the accumulation time of the photoelectric conversion section PD, Vpd'≈0 is obtained. Accordingly, correction image data Vr obtained by difference between the output signals of the main pixel and the sub pixel is represented in symbols as in the following equation (11).

$$Vr = Vs5 - Vn5 = Vnb \quad (11)$$

Here, since the differential image data is (Vp−Vnb), it is possible to acquire the light signal Vp alone and obtain image having excellent S/N by taking difference between the differential image data and the correction image data Vr. Further in addition to the capability of reducing time of acquiring correction image data similarly to the second embodiment, noise can be effectively removed, since the only difference is accumulation time and the drive pulses for the main pixel and for the sub pixel are the same between when acquiring correction image data and when acquiring differential image data. The data computing method after correction is the same as in the first embodiment and will not be described.

Embodiment 4

Figure 9A:
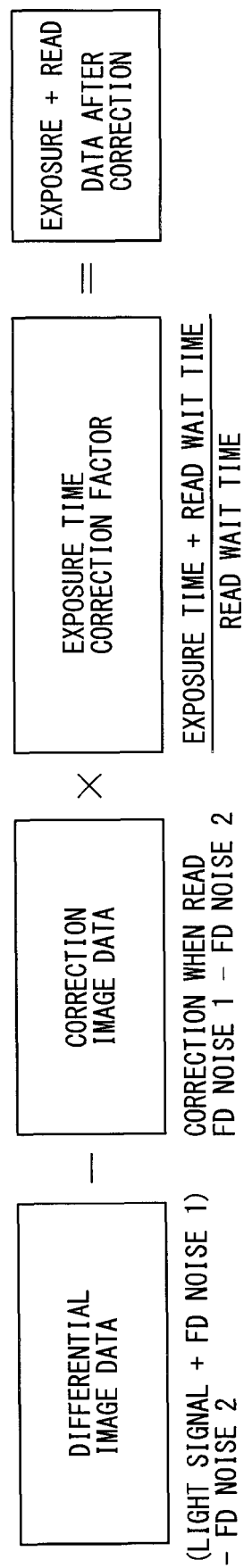
FIGS. 9A and 9B are an illustration for showing outline of computing operation of image data in the solid-state imaging apparatus according to a fourth embodiment of the invention, and a timing chart for explaining operation for acquiring differential image data thereof.

A fourth embodiment will now be described. The construction of the solid-state imaging apparatus itself according to the fourth embodiment is the same as the solid-state imaging apparatus according to the first embodiment shown in FIG. 4A, and its description by way of drawing will be omitted. The fourth embodiment is different from the first embodiment in that an exposure time correction factor is used to correct differential image data in computing image data. An outline of the computing method of image data in the fourth embodiment will now be described by way of FIG. 9A. At first, a differential image data is acquired by subtracting output signal of the sub pixel containing FD noise from output signal of the main pixel that contains light signal and FD noise. Next, variance data (corrected correction image data) of the main pixel's FD noise and the sub pixel's FD noise corrected by correction factor computed for example from exposure time is removed from the differential image data to compute image data.

Figure 9B:
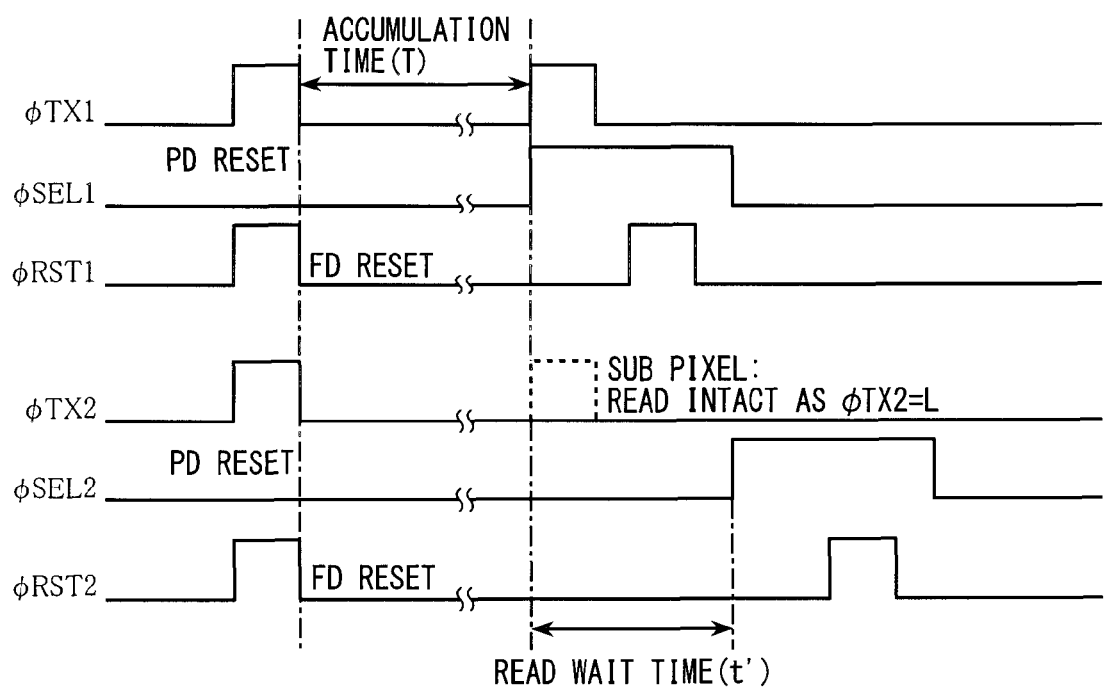

The operation of acquiring the differential image data according to the fourth embodiment will now be described by way of a timing chart shown in FIG. 9B. At first, transfer control signals φTX1, φTX2, and reset control signals φRST1, φRST2 are driven to high level to start concurrent reset of the photoelectric conversion section PD and FD of all pixels. Next, the transfer control signals φTX1, φTX2, and reset control signals φRST1, φRST2 are brought to low level to end the reset of the photoelectric conversion section PD and reset of FD, and accumulation of the photoelectric conversion section PD is started. Subsequently, the transfer control signal φTX1 is driven to high level to end the accumulation period and effect a transfer to FD of accumulated electric charge of the photoelectric conversion section PD of the pixel (main pixels) of the first row. The transfer control signal φTX2 on the other hand maintains low level so that a transfer to FD of accumulated electric charge of the photoelectric conversion section PD of the pixel (sub pixels) of the second row is not effected. Next, rows selected by select control signal in a manner of time series are sequentially read out. In particular at first, select control signal φSEL1 is driven to high level to output the light signal of the pixel (main pixel) row of the first row to the line memory 102, and the select control signal φSEL1 is then brought to low level to end the outputting of pixel signals of the first row. Next, select control signal φSEL2 is driven to high level to output signal of the pixel (sub pixel) row of the second row to the line memory 102, and the select control signal φSEL2 is then brought to low level to end the outputting of pixel signals of the second row.

The output signal of the main pixel row by such drive operation is the signal where FD leak signal (referred to as Vsf in this description) and signal due to leakage light (referred to as Vse in this description), i.e. noise signals are added to light signal (referred to as Vp in this description) accumulated at the photoelectric conversion section PD. Supposing the signal of the main pixel as Vs6, it is represented in symbols as in the following equation (12).

$$Vs6 = Vp + Vsf + Vse \qquad (12)$$

Further, output signal of the sub pixel row is the signal where FD variance signal (referred to as Vnb2 in this description) is added to FD leak signal Vnf and leakage light signal Vne, i.e. noise signals. The output signal of the sub pixel supposed as Vn6 is represented in symbols as in the following equation (13).

$$Vn6 = Vnf + Vne + Vnb2 \qquad (13)$$

Here, FD variance signal Vnb2 is continuously generated during the period from the end of reset of FD to the time at which it is read out. It should be noted that, in the example of operation shown in the timing chart of FIG. 9B, period during which variance signal Vnb2 is being generated is the period where read waiting time (t') is added to accumulation time (T). Such FD variance signal Vnb2 is represented in symbols as in the following equation (14).

$$Vnb2 = Nb \times (T+t') \qquad (14)$$

where Nb is FD variance signal generated per unit time. By substituting the above equation (14) for equation (13) of the output signal Vn6 of the sub pixel row, the following equation (15) is obtained.

$$Vn6 = Vnf + Vne + Nb \times (T+t') \qquad (15)$$

It should be noted in this case that, since the main pixel and the sub pixel are read out at and in substantially the same time and period, the FD leak signals and the leakage light signals are respectively of substantially the same value and are represented by equation of symbols as:

Vsf=Vnf, Vse=Vne.

Accordingly, when differential image data is computed by taking difference between the main pixel signal and the sub pixel signal, the following equation (16) is obtained.

$$Vs6 - Vn6 = Vp - Nb \times (T+t') \qquad (16)$$

Although the method of acquiring correction image data in this case is the same as the first embodiment or the second embodiment and will not be described, the correction image data is obtained as −Vnb. It is to be noted that the correction image data (−Vnb) here is the product by multiplication of FD variance signal Nb occurring per unit time and the read waiting time t' and is represented in symbols as:

$$Vnb = Nb \times t'$$

Accordingly, it is possible to acquire the light signal Vp alone and obtain image having excellent S/N such that correction image data is multiplied by factor computed from accumulation time, i.e. exposure time correction factor (T+t')/t' to correct the correction image data, and the corrected correction image data is removed from the differential image data.

Embodiment 5

Figure 10:
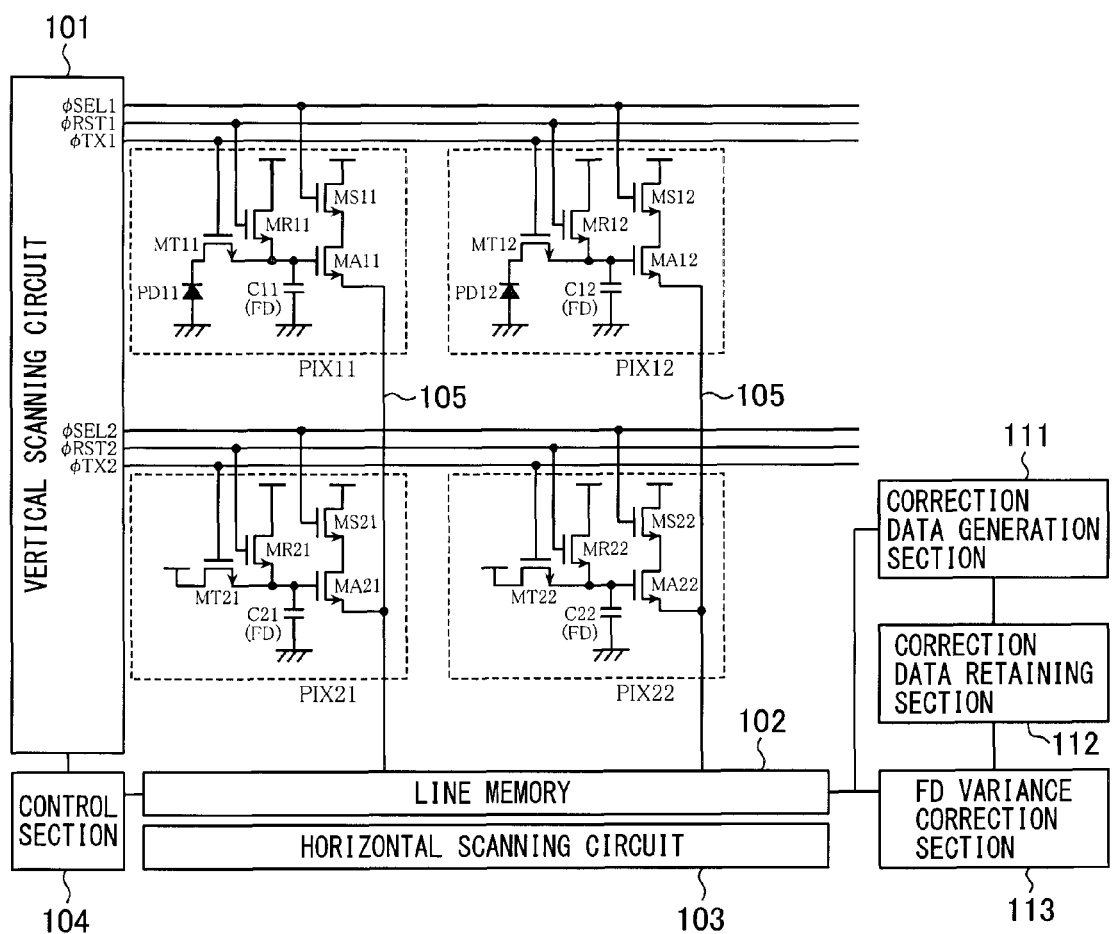
FIG. 10 shows construction of solid-state imaging apparatus according to a fifth embodiment of the invention.

A fifth embodiment will now be described. FIG. 10 shows construction of the solid-state imaging apparatus according to the fifth embodiment. Included at the inside of a main pixel PIX11 in the solid-state imaging apparatus according to the fifth embodiment are: a photoelectric conversion section PD11; FD (memory C11) for accumulating signal generated at the photoelectric conversion section PD11; a transfer switch MT11 for controlling a transfer from the photoelectric conversion section PD11 to FD; a reset switch MR11 for resetting FD; an amplification section MA11 for amplifying signal of FD; and a select switch MS11 for selecting the pixel. Further, included at the inside of a sub pixel PIX21 are: a switch MT21 connected at one end to a constant potential supply having the same construction as the transfer switch MT11 of the main pixel PIX11; FD (memory C21) for accumulating a noise; a reset switch MR21 for resetting FD; an amplification section MA11 for amplifying signal of FD; and a select switch MS 21 for selecting the pixel. The constituent components of each pixel are connected as shown in FIG. 10, and main pixels and sub pixels are two-dimensionally arranged (2 rows by 2 columns in the illustrated example) on every other row to form a pixel section. It should be noted that the constituent components of the other main pixel PIX12, and sub pixel PIX22 of the pixel section are denoted by those numerals that correspond to row and column of each pixel.

The transfer switches MT11, MT12 of the main pixels PIX11, PIX12 of the first row are controlled by transfer control signal φTX1 outputted from a vertical scanning circuit 101, and switches MT21, MT22 of the sub pixels PIX21, PIX22 of the second row are controlled by control signal φTX2. The select switches MS11, MS12 of the main pixels of the first row are controlled by select control signal φSEL1, and the select switches MS21, MS22 of the sub pixels of the second row by select control signal φSEL2; the output signals of selected pixel row are written to a line memory 102. Subsequently, the output signals stored at the line memory 102 are read out by a horizontal scanning circuit 103. Further included in the same manner as the first embodiment shown in FIG. 4A are: a correction data generation section 111; correction data retaining section 112; and FD variance correction section 113.

The operation of acquiring a differential image data, operation of acquiring a correction image data, and computing operation of a final image data after correction in the solid-state imaging apparatus according to this embodiment are all the same as those in the first to fourth embodiments and will not be described. In the present embodiment, image having excellent S/N can be obtained by using the pixel construction as described above, since an area of the sub pixel without having photoelectric conversion section PD can be made smaller, and on the other hand since a larger area can be provided for the photoelectric conversion section PD of the main pixel.

Embodiment 6

Figure 11:
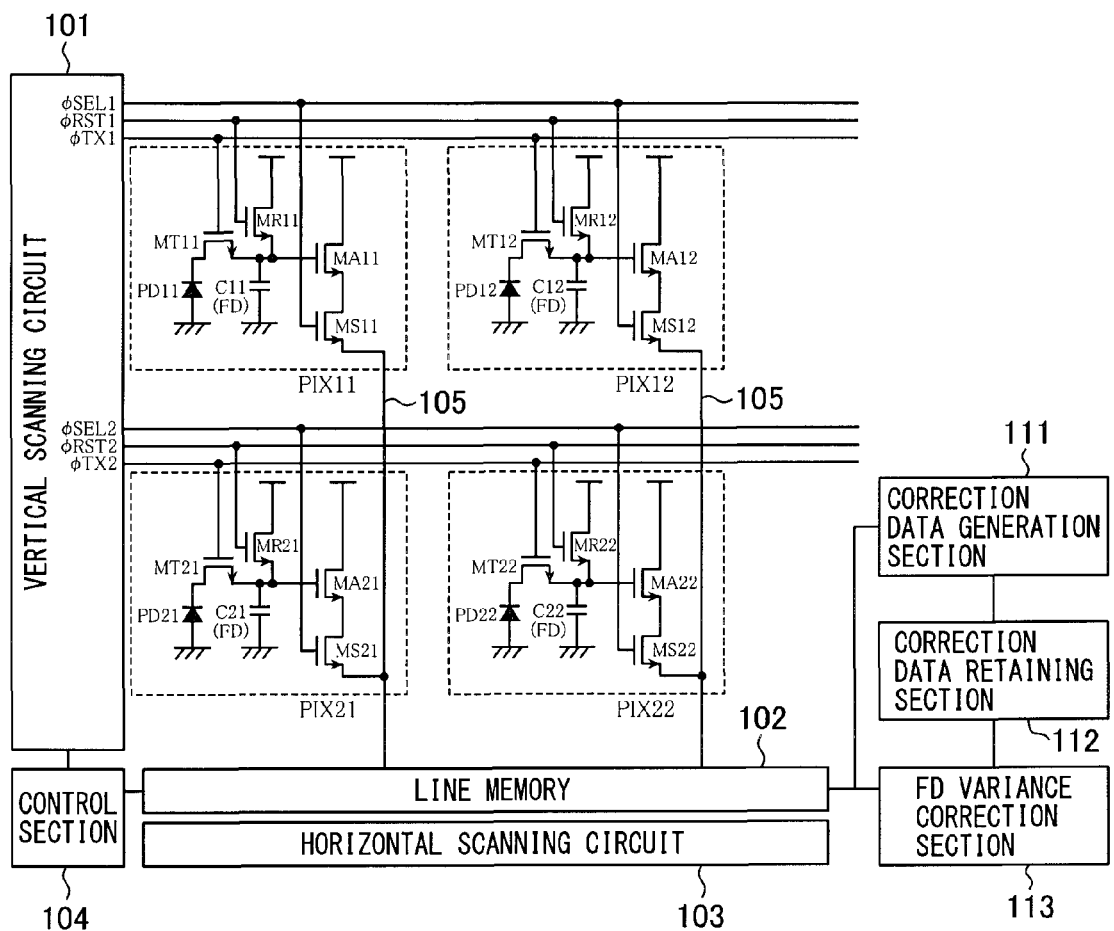
FIG. 11 shows construction of solid-state imaging apparatus according to a sixth embodiment of the invention.

A sixth embodiment will now be described. FIG. 11 shows construction of the solid-state imaging apparatus according to the sixth embodiment. The sixth embodiment is different from the first embodiment shown in FIG. 4A only in construction of connection of a portion inside the pixel, and the construction of the rest is the same as the first embodiment. In particular, included at the inside of a main pixel PIX11 are: a photoelectric conversion section PD11; FD (memory C11) for accumulating signal generated at the photoelectric conversion section PD11; a transfer switch MT11 for controlling a transfer from the photoelectric conversion section PD11 to FD; a reset switch MR11 for resetting FD; an amplification section MA11 for amplifying signal of FD; and a select switch MS11 for selecting the pixel. Further included at the inside of a sub pixel PIX21 are: a photoelectric conversion section PD21; FD (memory C21) for accumulating signal generated at the photoelectric conversion section PD21; a transfer switch MT21 for controlling transfer from the photoelectric conversion section PD21 to FD; a reset switch MR21 for resetting FD; an amplification section MA21 for amplifying signal of FD; and a select switch MS21 for selecting the pixel. It is similar to the first embodiment in that the main pixels and the sub pixels are two-dimensionally arranged (2 rows by 2 columns in the illustrated example) on every other row. It is different from the first embodiment in that, while the amplification section of each pixel in the first embodiment is directly connected to line memory 102, the select switch of each pixel is connected to line memory 102 in the sixth embodiment.

The transfer switches MT11, MT12 of the main pixels of the first row are controlled by transfer control signal φTX1, and transfer switches MT21, MT22 of the sub pixels of the second row by transfer control signal φTX2; and the select switches MS11, MS12 of the main pixels of the first row are controlled by select control signal φSEL1, and the select switches MS21, MS22 of the sub pixels of the second row by select control signal φSEL2. Further it is the same as the first embodiment in the operation where the output signals of selected pixel row are written to the line memory 102, and the output signals stored at the line memory 102 are subsequently read out by horizontal scanning circuit 103.

The operation of acquiring a differential image data, operation of acquiring a correction image data, and computing operation of a final image data after correction in the solid-state imaging apparatus according to the sixth embodiment are the same as those in the first to fourth embodiments and will not be described. Also in the sixth embodiment, image having excellent S/N can be similarly obtained.

Embodiment 7

Figure 12:
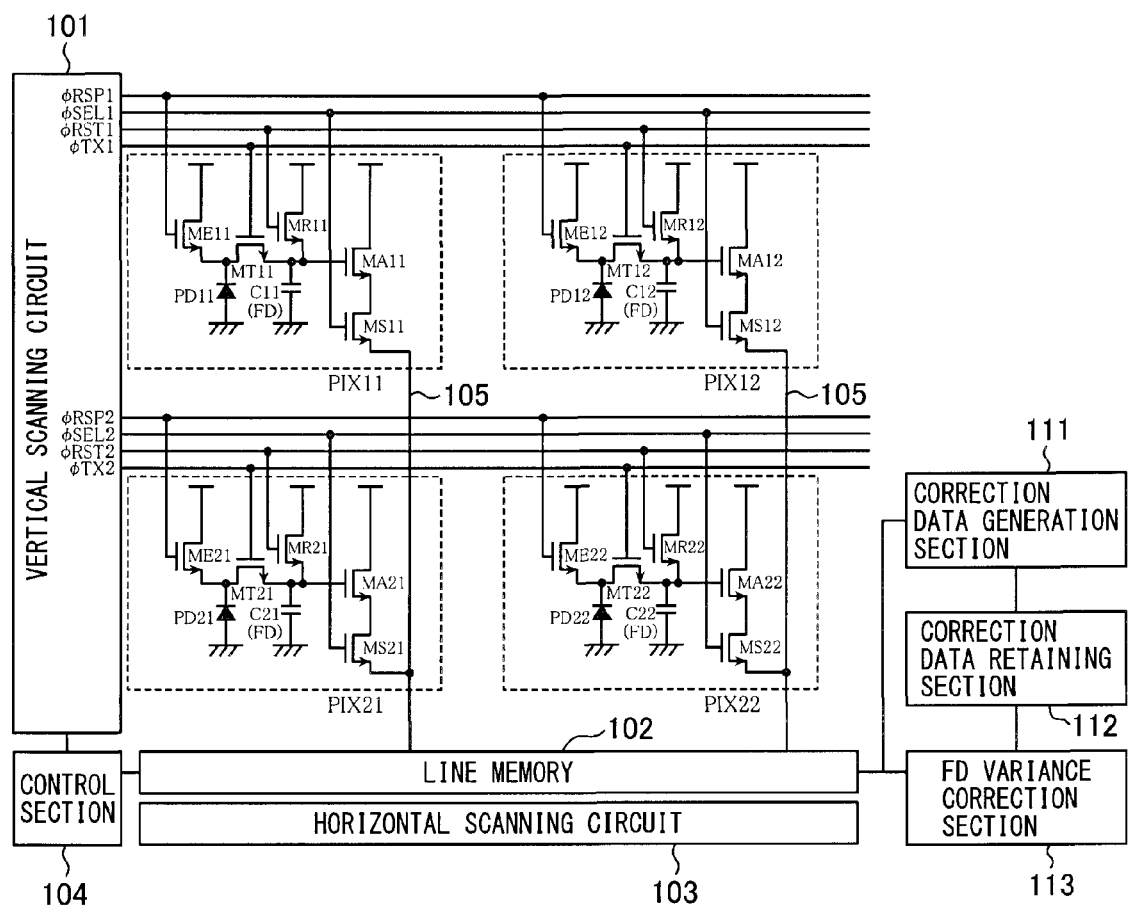
FIG. 12 shows construction of solid-state imaging apparatus according to a seventh embodiment of the invention.

A seventh embodiment will now be described. FIG. 12 shows construction of the solid-state imaging apparatus according to the seventh embodiment; the seventh embodiment is different only in pixel construction from the first embodiment shown in FIG. 4A, and the construction of the rest is the same. In particular, included at the inside of a main pixel PIX11 are: a photoelectric conversion section PD11; a reset switch ME11 for resetting the photoelectric conversion section PD11; FD (memory C11) for accumulating signal generated at the photoelectric conversion section PD11; a transfer switch MT11 for controlling a transfer from the photoelectric conversion section PD11 to FD; a reset switch MR11 for resetting FD; an amplification section MA11 for amplifying signal of FD; and a select switch MS11 for selecting the pixel. Further included at the inside of a sub pixel PIX21 are: a photoelectric conversion section PD21; a reset switch ME21 for resetting the photoelectric conversion section PD21; FD (memory C21) for accumulating signal generated at the photoelectric conversion section PD21; a transfer switch MT21 for controlling a transfer from the photoelectric conversion section PD21 to FD; a reset switch MR21 for resetting FD; an amplification section MA21 for amplifying signal of FD; and a select switch MS21 for selecting the pixel. These are connected as shown in FIG. 12. The main pixels and the sub pixels are then two-dimensionally arranged (2 rows by 2 columns in the illustrated example) on every other row to form a pixel section. It should be noted that the constituent components of the other main pixel PIX12, and sub pixel PIX22 of the pixel section are denoted by those numerals that correspond to row and column of each pixel.

The transfer switches MT11, MT12 of the main pixels PIX11, PIX12 of the first row are controlled by transfer control signal φTX1 outputted from a vertical scanning circuit 101, and transfer switches MT21, MT22 of the sub pixels PIX21, PIX22 of the second row are controlled by transfer control signal φTX2. The reset switches ME11, of the main pixels of the first row are controlled by PD reset control signal φRSP1, and the reset switches ME21, of the sub pixels of the second row are controlled by PD reset control signal φRSP2. The select switches MS11, of the main pixels of the first row are controlled by select control signal φSEL1, and the select switches MS21, of the sub pixels of the second row by select control signal φSEL2; the output signals of selected pixel row are written to a line memory 102. Subsequently, the output signals stored at the line memory 102 are read out by a horizontal scanning circuit 103.

Figure 13:
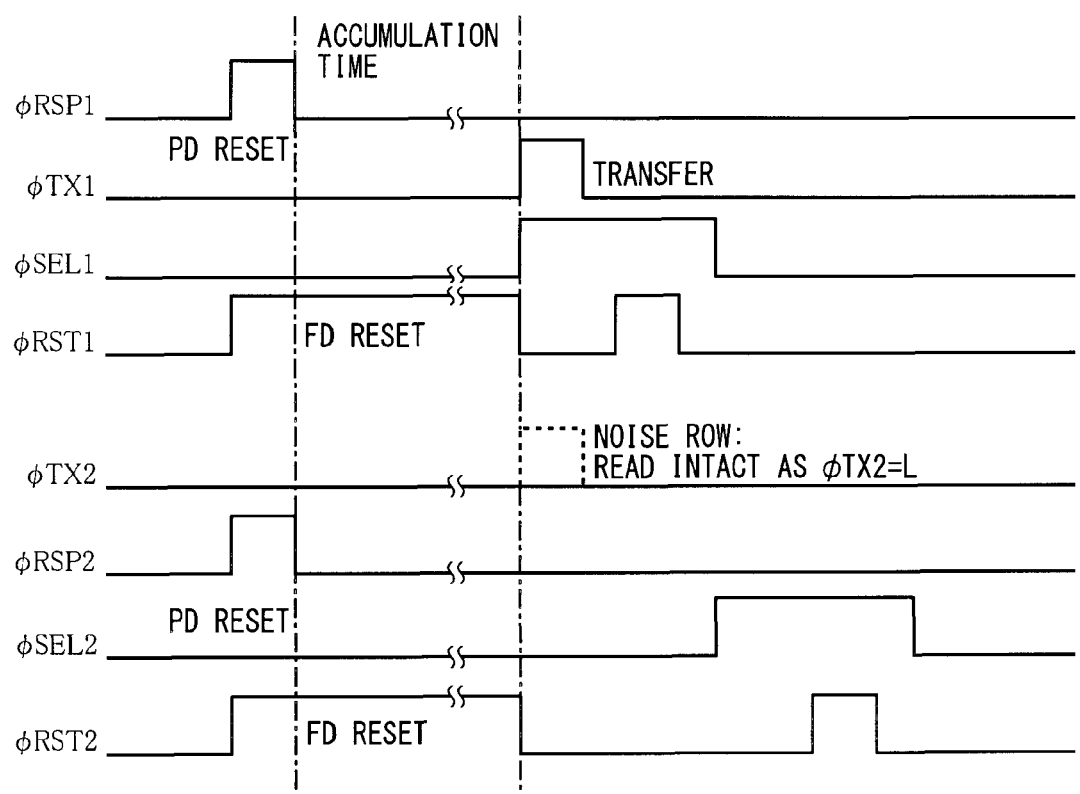
FIG. 13 is a timing chart for explaining operation of the solid-state imaging apparatus according to the seventh embodiment shown in FIG. 12.

The operation of the solid-state imaging apparatus having such construction will now be described by way of a timing chart shown in FIG. 13. At first, PD reset control signals φRSP1, φRSP2 are driven to high level to effect concurrent reset of photoelectric conversion section PD of all pixels, and the PD reset control signals φRSP1, φRSP2 are then brought to low level to start an accumulation of light signal at the photoelectric conversion section PD. In the intervening time, FD reset control signals φRST1, φRST2 are driven to high level to start a reset of FD, and the FD reset control signals φRST1, φRST2 are subsequently brought to low level to end the reset of FD. Subsequently, transfer control signal φTX1 to the main pixels of the first row is driven to high level to end the accumulation time of the photoelectric conversion section PD and effect a transfer to FD of light signal of the photoelectric conversion section PD. The transfer control signal φTX2 to the sub pixels of the second row on the other hand maintains low level so as not to effect a transfer of light signal of the photoelectric conversion section PD of the second row. Next, pixel rows selected by select control signal in the manner of time series are sequentially read out. In particular at first, the select control signal φSEL1 is driven to high level to output light signals of the pixel (main pixel) row of the first row to the line memory 102, and the select control signal φSEL1 is then brought to low level to end the outputting. Next, select control signal φSEL2 is driven to high level to output pixel signals of the pixel (sub pixel) row of the second row to the line memory 102.

The output signal of the main pixel outputted in this manner is signal where FD leak signal (referred to as Vsf in this description) and signal due to leakage light (referred to as Vse in this description), i.e. noise signals are added to light signal Vp accumulated at the photoelectric conversion section PD. Supposing signal of the main pixel as Vs7, it is represented in symbols as in the following equation (17).

$$Vs7 = Vp + Vsf + Vse \quad (17)$$

Further, the output signal of the sub pixel is signal where FD leak signal Vnf and leakage light signal Vne, i.e. noise signals, and FD variance signal Vnb are added up so that the output signal of the sub pixel supposed as Vn7 is represented in symbols as in the following equation (18).

$$Vn7 = Vnf + Vne + Vnb \quad (18)$$

In this case, since the main pixel and the sub pixel are read out substantially at the same point in time, the FD leak signals and the leakage light signals are respectively of substantially the same value and are represented by equation of symbols as:

$$Vsf = Vnf, Vse = Vne.$$

Accordingly, differential image data obtained by difference between the signals of the main pixel and the sub pixel is represented in symbols as in the following equation (19).

$$Vs7 - Vn7 = Vpd - Vnb \quad (19)$$

The operation of acquiring the correction image data in this embodiment is the same as in the first to fourth embodiments and will not be described. It is then possible to acquire the light signal Vp alone and obtain image having excellent S/N by acquiring data after correction from the above differential image data and correction image data.

Embodiment 8

Figure 14:
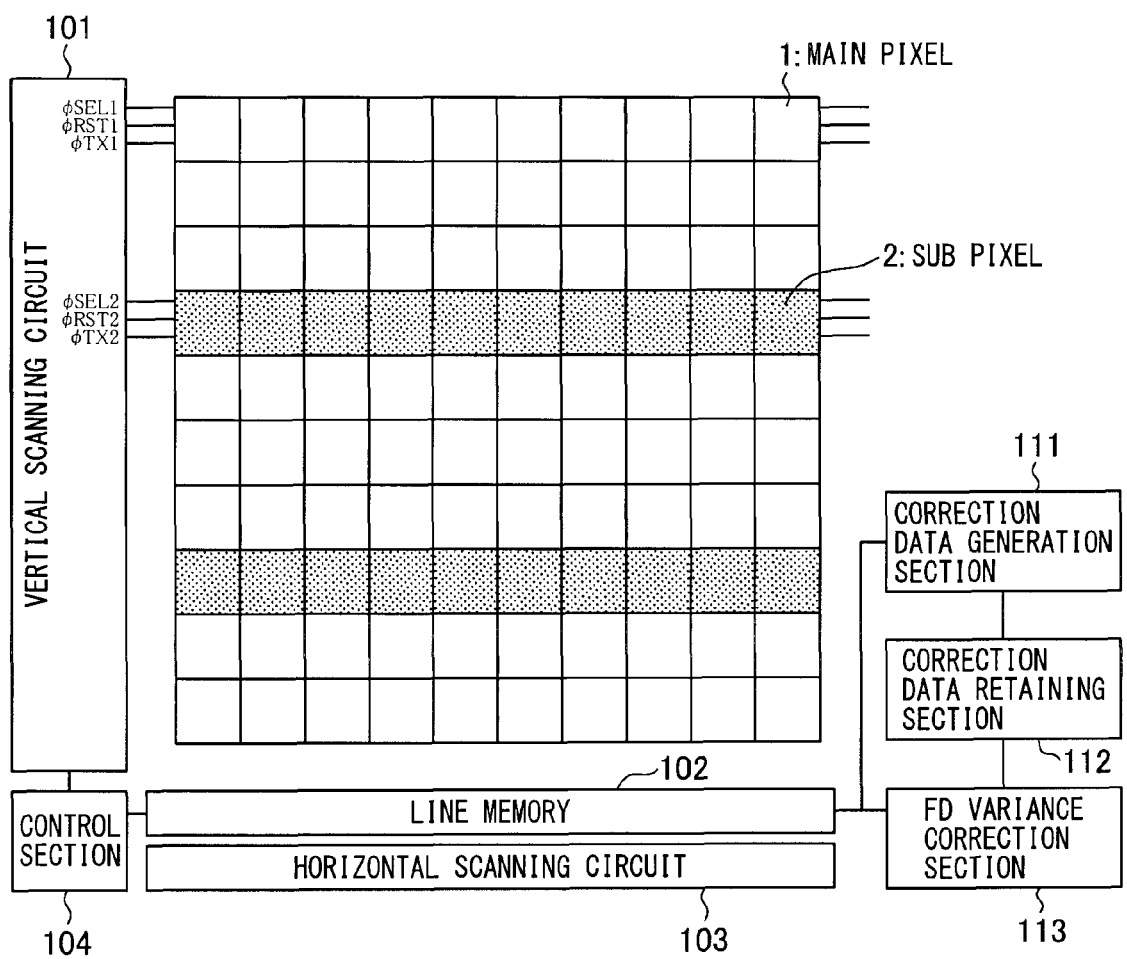
FIG. 14 shows construction of solid-state imaging apparatus according to an eighth embodiment of the invention.
Figure 15:
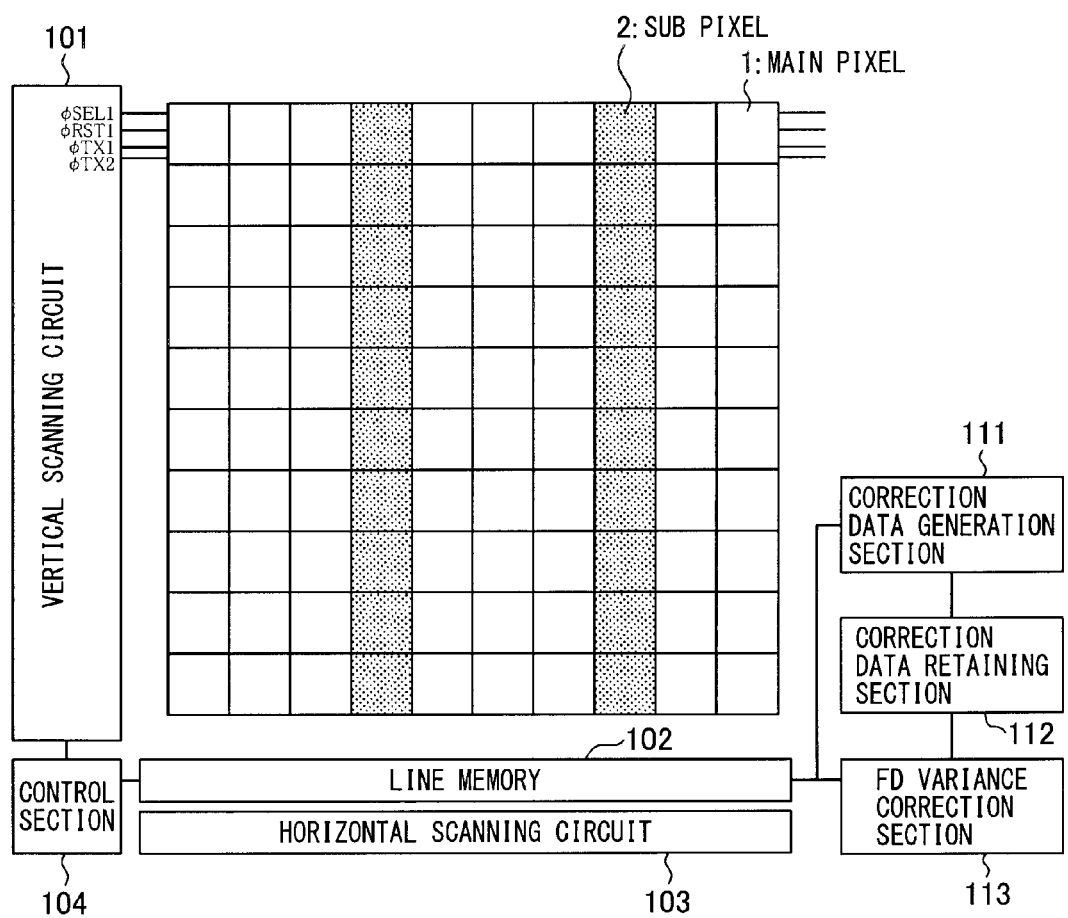
FIG. 15 shows construction of a modification of the solid-state imaging apparatus according to the eighth embodiment shown in FIG. 14.

An eighth embodiment will now be described. FIG. 14 shows construction of the solid-state imaging apparatus according to the eighth embodiment. This embodiment is different from the first embodiment shown in FIG. 4A in disposition of main pixels 1 and sub pixels 2 in the pixel section, and the construction of the rest is similar to the first embodiment. In this embodiment as shown in FIG. 14, main pixel rows are disposed in succession of a plurality of rows (3 rows in the illustrated example), and one sub pixel row is disposed next to it. Further as shown in FIG. 15, it is also possible to dispose main pixels 1 and sub pixels 2 separately in column direction. In FIG. 15, one sub pixel column is disposed after disposing 3 main pixel columns in succession. Furthermore, it is also possible as shown in FIG. 16 to dispose main pixels 1 in two-dimensional succession and to dispose sub pixel column adjacently to it.

Figure 16:
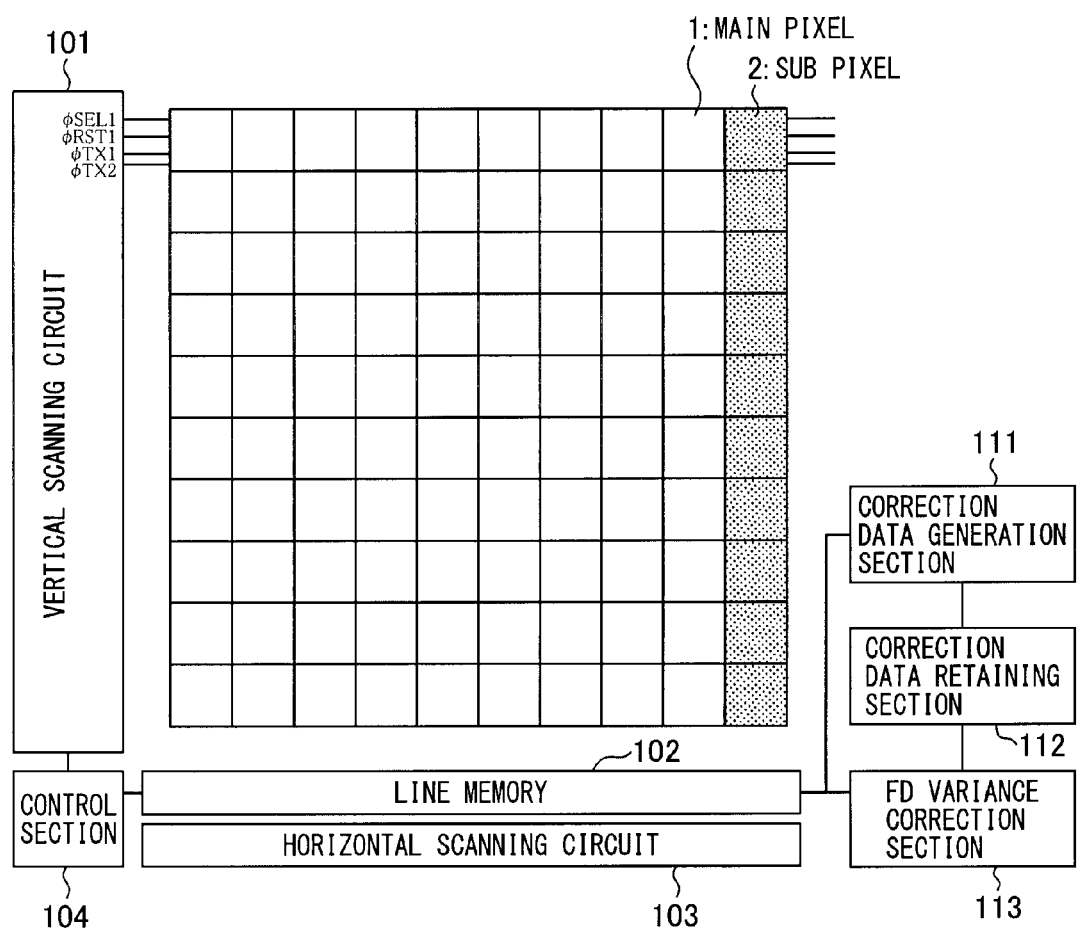
FIG. 16 shows construction of another modification of the solid-state imaging apparatus according to the eighth embodiment shown in FIG. 14.

In the example of FIG. 16, the main pixels 1 are two dimensionally disposed (10 rows by 9 columns in the illustrated example), and one column of sub pixels 2 is disposed on the right-side end thereof. The construction of the reset of the solid-state imaging apparatus including construction of each pixel and the operation of acquiring data after correction are the same as in the first to seventh embodiments and will not be described. By disposing the main pixels 1 and the sub pixels 2 as the above, the number of main pixels can be increased so as to obtain image having high quality.

Embodiment 9

Figure 17:
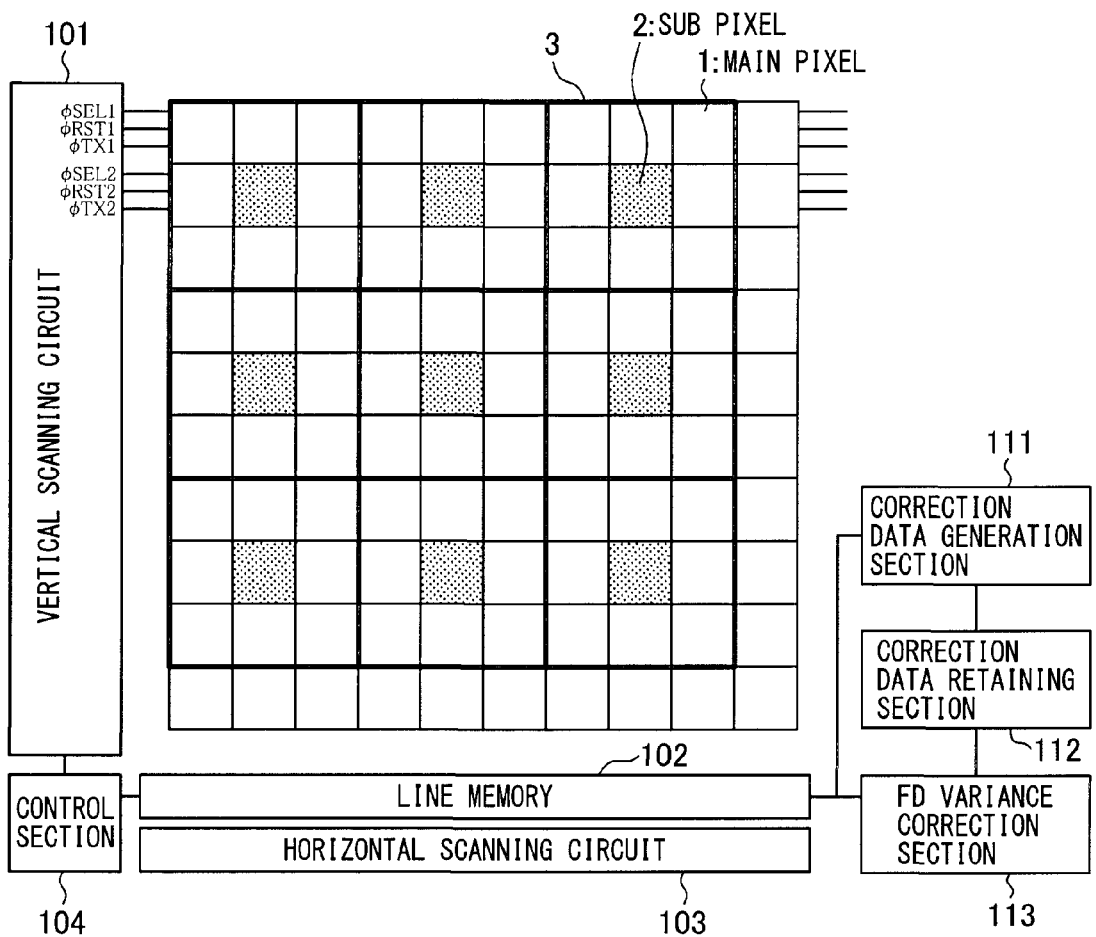
FIG. 17 shows construction of solid-state imaging apparatus according to a ninth embodiment of the invention.

A ninth embodiment will now be described. Also in the ninth embodiment as shown in FIG. 17, the disposition of main pixels and sub pixels in the pixel section is specifically determined, and the construction of the rest is similar to the first embodiment. In particular, a pixel unit 3 is formed of eight main pixels 1 that surround one sub pixel 2, and such pixel units 3 are two dimensionally arranged (3 rows by 3 columns in the illustrated example) to form a pixel section. The construction of solid-state imaging apparatus other than the construction of pixel section and the operation of acquiring data after correction are the same as in the first to seventh embodiments and will not be described. By disposing the main pixels 1 and sub pixels 2 in this manner, the number of main pixels can be increased similarly to the eighth embodiment so as to obtain image having high quality.

According to the first aspect of the invention as has been described by way of the above embodiments, it is possible to achieve a solid-state imaging apparatus where image data having high S/N can be acquired by setting simultaneous accumulation time to all pixels so as to reduce a fixed noise when differentiating between a first pixel signal and a second pixel signal. According to the second aspect, characteristic variance can be corrected by using the same pixel construction for the first pixel and for the second pixel. According to the third aspect, since absence of photoelectric conversion section makes it possible to reduce area of the second pixel, area of the photoelectric conversion section of the first pixel can be made larger so as to acquire an image having excellent S/N. According to the fourth aspect, the number of first pixels can be increased to obtain an image having high quality. According to the fifth aspect, an image having more excellent S/N can be obtained by providing function for computing characteristic variance data with considering accumulation time. According to the sixth aspect, by providing a function for acquiring characteristic variance data of the first pixel and the second pixel by a very short accumulation time, it is possible to reduce a time required for acquiring characteristic variance data, and at the same time an image having excellent S/N can be obtained. According to the seventh aspect, a noise can be effectively removed and an image having excellent S/N can be acquired by providing function where characteristic variance data of the first pixel and the second pixel is acquired without accumulating signal associated with object image at the input section in the same accumulation time as when acquiring the differential image data.

What is claimed is:

1. A solid-state imaging apparatus comprising:
pixel section with a plurality of pixels that are two-dimensionally arranged, said pixels including a first pixel having a first input section for accumulating a signal associated with object image, a first amplification section for amplifying signals accumulated at said first input section so as to generate a first pixel signal, a first reset section for resetting said first input section, and a first select section for selecting said first amplification section to cause said first pixel signal to be outputted onto a signal output line, and a second pixel having a second input section for accumulating a signal corresponding to a noise generated at said first input section, a second amplification section for amplifying signals accumulated at said second input section so as to generate a second pixel signal, a second reset section for resetting said second input section, and a second select section for selecting said second amplification section to cause said second pixel signal to be outputted onto said signal output line;
a control section for, after simultaneously and concurrently resetting all the said first and second input sections, effecting control so as to cause all the said first input sections to concurrently and simultaneously accumulate said signal associated with said object image having the same exposure start timing;
a correction data retaining section for retaining correction data to correct a characteristic variance between said first input section and said second input section, said correction data is generated by taking a difference between a noise signal of said first input section and a noise signal of said second input section containing said characteristic variance; and
a variance correction section for generating a third pixel signal corresponding to a difference between said first pixel signal and said second pixel signal where said characteristic variance is corrected by subtracting said correction data from said third pixel signal.

2. The solid-state imaging apparatus according to claim 1, wherein said first pixel further includes a first photoelectric conversion section and a first transfer section for transferring a signal generated at said first photoelectric conversion section to said first input section, and said second pixel further includes a second photoelectric conversion section and a second transfer section for transferring a signal generated at said second photoelectric conversion section to said second input section, and wherein said control section effecting control so as to start an accumulation of said signal at said first and second photoelectric conversion sections with simultaneously and concurrently resetting all the said first and second photoelectric conversion sections, and after a predetermined time so as to simultaneously and concurrently effect a transfer of said signal from said first photoelectric conversion section to said first input section for said first pixels while on the other hand so as not to effect a transfer from said second photoelectric conversion section to said second input section for the second pixels.

3. The solid-state imaging apparatus according to claim 1, wherein said first pixel further includes a photoelectric conversion section and a first transfer section for transferring a signal generated at said photoelectric conversion section to said first input section, and said second pixel further includes a connecting section for connecting between a constant potential supply and said second input section, and wherein said control section effecting control so as to start an accumulation of said signal at said photoelectric conversion section with simultaneously and concurrently resetting the photoelectric conversion section of all the said first pixels, and after a predetermined time so as to simultaneously and concurrently effect a transfer of said signal from said photoelectric conversion section to said first input section for said first pixels while on the other hand so as not to effect a function of said connecting section for the second pixels.

4. The solid-state imaging apparatus according to claim 1, wherein said second pixel is disposed for every predetermined ones of said first pixels.

5. The solid-state imaging apparatus according to claim 1, wherein said variance correction section corrects said correction data in accordance with an exposure time.

6. The solid-state imaging apparatus according to claim 1, wherein said correction data retaining section, after simultaneously resetting said first and second input sections, generates said correction data based on an output signal from said first pixel obtained with accumulating at said first input section said signal associated with said object image having the same exposure start timing and substantially zero exposure time and an output signal from said second pixel.

7. The solid-state imaging apparatus according to claim 1, wherein said correction data retaining section, after simultaneously resetting said first and second input sections, generates said correction data based on an output signal from said first pixel obtained without accumulation of said signal associated with said object image at said first input section and an output signal from said second pixel.

* * * * *